United States Patent [19]

Dell'Acqua

[11] Patent Number: 4,966,039
[45] Date of Patent: Oct. 30, 1990

[54] ELECTRICAL FORCE AND/OR DEFORMATION SENSOR, PARTICULARLY FOR USE AS A PRESSURE SENSOR

[75] Inventor: Roberto Dell'Acqua, Pavia, Italy

[73] Assignee: Marelli Autronica S.p.A., Milan, Italy

[21] Appl. No.: 508,513

[22] Filed: Apr. 12, 1990

Related U.S. Application Data

[63] Continuation of Ser. No. 192,414, May 10, 1988, abandoned.

[51] Int. Cl.⁵ ............... G01L 1/22; G01L 7/08; G01L 9/06
[52] U.S. Cl. ............................................. 73/727; 338/4
[58] Field of Search ............... 73/720, 721, 726, 727, 73/754; 338/4, 5, 42, 3

[56] References Cited

U.S. PATENT DOCUMENTS

| | | | |
|---|---|---|---|
| 4,444,054 | 4/1984 | Schaff, Jr. | 73/721 |
| 4,481,497 | 11/1984 | Kurtz et al. | 73/708 |
| 4,576,052 | 3/1986 | Sugiyama | 73/727 |
| 4,672,354 | 12/1985 | Kurtz et al. | 73/727 |
| 4,777,826 | 10/1988 | Rud, Jr. et al. | 338/4 |
| 4,864,271 | 9/1989 | Yajima | 338/4 |

Primary Examiner—Donald O. Woodiel
Attorney, Agent, or Firm—Sughrue, Mion, Zinn, Macpeak & Seas

[57] ABSTRACT

An electrical force and/or deformation sensor includes a support structure constituted by a rigid plate in one face of which a recess is formed. The bottom wall of the recess is thin and is resiliently deformable under the action of a force or pressure to be measured. At least one piezoresistive sensitive element constituted by a thick-film resistor is applied to the other face of the plate in correspondence with the recess. Electrical conductor elements connected to the sensitive element or elements are also applied to this face of the plate to enable its connection to supply and processing circuits. These circuits may conveniently be produced by thick- or thin-film hybrid circuit technology on the same face of the support plate as that which carries the piezoresistive element or elements. In order to measure absolute pressure, the inlet opening of the recess may be closed by a gas-tight seal so as to define a closed cavity in the thickness of the plate, in which a vacuum is formed.

6 Claims, 1 Drawing Sheet

ELECTRICAL FORCE AND/OR DEFORMATION SENSOR, PARTICULARLY FOR USE AS A PRESSURE SENSOR

This is a continuation of application Ser. No. 07/192,414 filed May 10, 1988 now abandoned.

The present invention relates to an electrical force and/or deformation sensor, particularly for use as a pressure sensor.

More specifically, the subject of the invention is a sensor comprising a support structure including an element which is resiliently deformable by a force or pressure to be measured and on which at least one piezoresistive sensitive element constituted by a thick- or thin-film resistor is deposited, the structure carrying electrical conductor means connected to the at least one sensitive element and adapted to enable its connection to supply and processing circuit means.

In known sensors of this type used, in particular, as pressure sensors, the piezoresistive sensitive elements are deposited by silk-screen printing on one face of a thin sheet made, for example, from a ceramic material. This sheet is then clamped between two rigid half-shells, also made, for example, from a ceramic material. The two half-shells together form a capsule and one of them usually has an opening for connection to an environment whose pressure is to be detected.

These known sensors thus have a plurality of parts (sheet, half-shells) which must be glued together, for example, with the use of a vitreous mastic cured in an oven. Moreover, in these known sensors, the connection of the piezoresistive elements to external supply and processing circuits involves the deposition, for example, by silk-screen printing, of conductive strips on the deformable sheet which carries the piezoresistive elements and on at least one of the half-shells which form the capsule. The connection of the conductive strips of this half-shell to the conductive strips of the sheet which carries the piezoresistive elements thus requires special devices and operations, for example, the use of metallised holes in the half-shell.

In view of the above, known sensors are generally complex and expensive to produce.

The object of the present invention is to produce an electrical sensor of the type defined above which has fewer parts and considerably smaller dimensions and less weight than known devices, and certainly has lower production costs.

According to the invention this object is achieved by means of an electrical force and/or deformation sensor, particularly for use as a pressure sensor, characterised in that the support structure is constituted by a rigid plate in one face of which is formed a recess whose bottom wall is thin and is resiliently deformable under the action of a force or pressure to be measured, the at least one sensitive element being deposited on the other face of the plate in correspondence with the bottom wall of the recess, the conductor means also being applied to the other face of the plate.

In the sensor according to the invention, the support structure is reduced to a single piece, that is, the rigid plate, and the element which is resiliently deformable by the force or pressure to be measured is constituted by the bottom wall of the recess. The structure of the sensor is thus greatly simplified. Moreover, both the piezoresistive elements and the conductive strips for their connection to supply and/or processing circuits may be deposited by silk-screen printing on a single surface, that is, on the face of the rigid plate opposite that in which the recess is formed.

Further characteristics and advantages of the sensor according to the invention will become clear from the detailed description which follows with reference to the appended drawings, providing purely by way of non-limiting example, in which.

Figure 1:
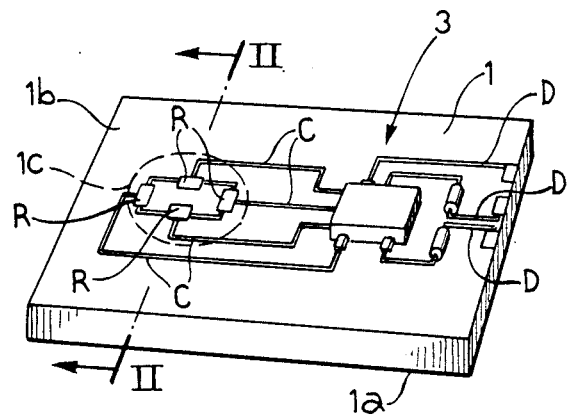
FIG. 1 is a perspective view of a sensor according to the present invention.
Figure 2:
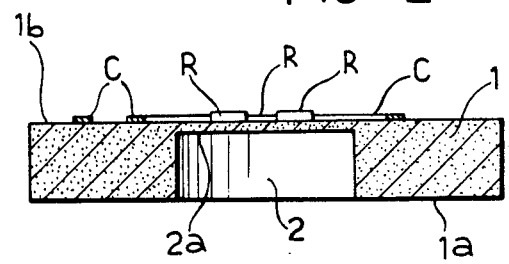
FIG. 2 is a section taken on the line II—II of FIG. 1.

With reference to FIG. 1, an electrical force and/or deformation sensor, and in particular a pressure sensor, according to the present invention comprises a rigid support plate 1 made, for example, from a ceramic material. As can be seen in FIG. 2 in particular, a recess 2 is formed in one face of the plate 1, the bottom wall 2a of which is thin and is resiliently deformable under the action of a force or pressure to be measured.

The plate 1 may have a thickness, for example, of 1.5–3 mm. The thickness of the bottom wall 2a of the recess is, for example, 150–200 microns.

The recess 2 is preferably cylindrical or slightly frusto-conical in shape with a cross-section which decreases progressively towards the bottom wall 2a.

In the embodiment illustrated, four thick- or thin-film resistors R which act as piezoresistive sensitive elements are deposited on the other face 1b of the plate 1 by silk-screen printing. These resistors may be connected to each other, for example, to form a Wheatstone bridge circuit. The connections between the various resistors are formed by conductive strips C also deposited on the face 1b of the plate by silk-screen printing techniques.

The resistors R are deposited on an area, indicated 1c in FIG. 1, which corresponds to the bottom wall 2a of the recess 2. This wall thus acts as a resiliently deformable element which, as a result of forces or pressures to be measured, can cause corresponding deformations of the resistors R and consequent variations in their resistance.

The resistors R are connected to a processing circuit, generally indicated 3 in FIG. 1, which may, to advantage, be produced, for example, by hybrid circuit technology on that face 1b of the plate 1 to which the resistors are applied. The connection between the resistors R and the processing circuit 3 is achieved by means of conductive strips C deposited by silk-screen printing.

The circuit 3 may include, for example, an operational amplifier for amplifying the voltage between two opposite vertices of the bridge circuit formed by the resistors.

The circuit 3 may be connected to circuits outside the sensor and to a voltage supply by means of further conductive strips D (FIG. 1).

The sensor shown in FIGS. 1 and 2 has an open recess 2 and is intended, for example, to enable the measurement of relative pressures. In order to measure the relative pressure in a particular environment, the recess 2 may be connected to the environment, for example, by means of a small tube one end of which is force-fitted into or otherwise fixed to the mouth of the recess 2.

Figure 3:
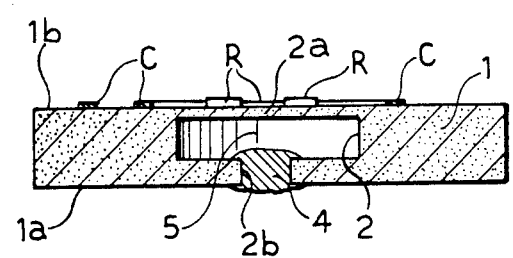
FIG. 3 is a section similar to FIG. 2, showing a different embodiment of the sensor according to the invention.

In order to measure absolute pressures, the above-described sensor may be modified in the manner illustrated in FIG. 3. In this embodiment, the plate 1 also has a recess 2, but with a mouth opening 2b of smaller transverse dimensions than those of the recess. This opening is closed and tightly sealed, for example, by means of the deposition of a drop of tin 4.

In this way, a cavity 5 closed with a gas-tight seal is defined within the plate 1. If a vacuum is created in this cavity by known means, the sensor thus produced will provide indications of the absolute pressures measured.

The sensor according to the invention has numerous advantages.

In the first place, the structure of the sensor comprises only one piece which can easily be produced, for example, by moulding or sintering. Mounting and gluing operations are therefore not required, as in prior-art sensors.

A further advantage lies in the fact that all the silk-screen printing operations are carried out on a single surface, that is, on the face 1b of the support plate 1.

Moreover, the overall dimensions and weight of the sensor are extremely small and the manufacture of the sensor is generally simpler and more economical.

I claim:

1. An electrical force and/or deformation sensor, particularly but not exclusively for use as a pressure sensor, comprising a support structure of ceramic material including an element which is resiliently deformable by a force or pressure to be measured, at least one piezoresistive sensitive element which is constituted by a thick-film resistor deposited by silk screen printing on the support structure, and electrical conductor means connected to the at least one sensitive element and adapted to enable its connection to supply and processing circuit means, wherein the support structure is constituted by a rigid plate in one face of which is formed a recess having a thin bottom wall which is resiliently deformable under the action of a force or pressure to be measured, and wherein said at least one sensitive element is applied to the other face of the plate in correspondence with the bottom wall of the recess, the conductor means comprising conductive strips deposited by silk screen printing on the other face of the plate.

2. A sensor according to claim 1, particularly for the measurement of relative pressures, wherein the recess is open.

3. A sensor according to claim 2, wherein the recess is essentially cylindrical in shape.

4. A sensor according to claim 1, particularly for the measurement of absolute pressures, wherein the inlet opening of the recess is closed by gas-tight sealing means so as to define a closed cavity in the thickness of the plate, in which a vacuum can be created.

5. A sensor according to claim 1, wherein the support structure also carries circuit means for processing the signals provided by the at least one sensitive element, and these circuit means are applied to that face of the plate on which the at least one sensitive element is deposited.

6. A sensor according to claim 5, wherein the circuit means are produced by hybrid circuit technology.

* * * * *